UNITED STATES PATENT OFFICE.

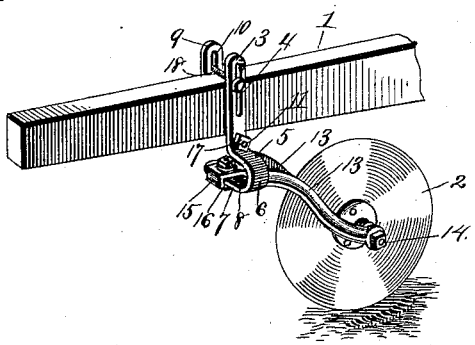

WILLIAM J. STOWE, OF ST. LOUIS, MISSOURI, ASSIGNOR TO THE SOUTH-WESTERN SUPPLY COMPANY, OF SAME PLACE.

ATTACHMENT FOR PLOW-COLTERS.

SPECIFICATION forming part of Letters Patent No. 472,082, dated April 5, 1892.

Application filed November 16, 1891. Serial No. 412,046. (No model.)

*To all whom it may concern:*

Be it known that I, WILLIAM J. STOWE, of St. Louis, Missouri, have invented certain new and useful Improvements in Attachments for Plow-Colters, of which the following is a full, clear, and exact description, reference being had to the accompanying drawings, forming a part hereof.

My invention relates to attachments for plow-colters for plows of various types, and more particularly to attachments for what are known as "disk" or "rolling" colters; and the objects of my invention are to provide means for connecting colters to the plow-beams which shall be simple, strong, and durable and also comparatively inexpensive in construction, and by means of which the colter shall be capable of easy and rapid adjustment, so as to cut to the required depth and also so as to travel at all times directly in line with the point of the plowshare.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is a perspective view of a portion of a plow-beam and of a disk colter connected thereto by my improved attachments. Fig. 2 is a side elevation of the same, looking at the opposite side of that exposed in Fig. 1. Fig. 3 is a transverse vertical section of the same on the line 3 3 of Fig. 2. Fig. 4 is a detached perspective view of the attaching-bars and its bolt-extension and also its retaining-nut. Fig. 5 is a similar view of the companion attaching-bar. Fig. 6 is a perspective view of the detachable upper bolt and its retaining-nut.

In the said drawings, 1 designates the beam of a plow, the said beam being either of wood or metal, and either of the form shown or any other suitable or preferred form, according to the type of plow to be used.

2 designates a disk colter, which may also be either of the precise form and type shown or of any other suitable or preferred type.

3 designates one of the connecting-bars for attaching the colter to the beam. This bar is at its upper part of vertically-elongated form and is provided with an elongated opening or slot 4, which extends longitudinally from near the upper end of the bar to near the lower termination of the said upper portion. At its lower termination this upper portion is integrally united with the upper end of a U-shaped extension, the upper arm or portion 5 of which projects horizontally outward from its point of union with the upper portion of the bar. The bend 6 of this U-shaped portion is vertically disposed, and the lower integral arm 7 of the extension projects horizontally inward and is prolonged considerably inward beyond the line of the upper portion of the bar. This lower arm 7 is likewise formed with an elongated longitudinal opening or slot 8, which extends from near the outer end of the arm 7 to near its point of union with the bend 6.

9 designates the companion connecting-bar, this bar being of substantially L shape and having its upper arm provided with an elongated longitudinal slot or opening 10, which extends from near the upper end of the bar nearly to its point of union with its lower arm 11. This lower arm 11 is of elongated cylindrical form and extends at right angles from the upper arm 9, and is furthermore externally screw-threaded either entirely throughout its length or else from its outer extremity toward its point of union with said upper arm as far as desired. Preferably for the sake of strength the lower end of the upper arm 9 is bent inwardly at right angles, as at 12, so as to form a flange of equal width to the body of the upper arm, the lower arm or bolt-extension 11 extending integrally from said flanges, as shown.

13 designates the fork or inverted-U-shaped standard for the colter, the axle 14 of the colter extending transversely through the lower ends of the arms of said standard and said arms extending obliquely upward and forward beneath the plow-beam 1. In the bend of this standard 13 is formed a head 15, through which is formed a transverse opening 16, for a purpose to be hereinafter explained.

In connecting a colter to a plow-beam by means of my improved attachments the two connecting-bars 3 and 9 are placed with their upper portions vertically against opposite sides of the plow-beam, the bolt-extension 11 of the bar 9 extending transversely beneath the plow-beam and at its outer end passing through an opening 16 in the lower part of the upper arm of the companion bar 3, a nut 17 being screwed upon the outer end of said bolt-extension and abutting against the outer surface of the bar 3. A second bolt 18 is now laid upon the upper side of the beam 1 so as to extend transversely thereof, the ends of this bolt passing through the slots 4 and 10 of the bars 3 and 9, and a nut 19 is screwed upon one end of the bolt. The head of this bolt abuts against the outer surface of one bar, while the nut 19 abuts against the outer surface of the companion bar, the two bars being thus held firmly against the sides of the plow-beam. The head 15 is now slipped upon the arm 7 of the bar 4, said arm entering the opening 16 of said head, and a bolt 20 is inserted vertically through the head and also through the slot 8 of the arm 7. Now by raising or lowering the vertical bars, the nut 19 being previously loosened, the colter can be adjusted so as to cut at any depth desired, the nut 19 being subsequently tightened again. It will also be seen that by loosening the nut 21 the fork can be set nearer to or farther from the outer end of the arm 7, and consequently the colter can be caused to always cut accurately in front of the plow-point or of the front edge of the mold-board.

From the above description it will be seen that the attachments are simple, durable, and inexpensive in construction, and that they permit of ready attachment and detachment of the colter, and also of the required adjustments of the said colter. It will thus be seen, also, that I have produced an adjustable colter-clamp which is applicable to either wooden or metal beam plows, and which is formed by using the fork of the colter as a part of the structure, there being but one piece of casting, and a bolt which is used outside of the colter proper.

Having thus described my invention, what I claim as new therein, and desire to secure by Letters Patent, is—

An improved attachment for plow-colters, comprising a vertically elongated bar having its body portion provided with a longitudinal slot and at its lower end with an integral U-shaped extension, having a longitudinal slot in its lower end or arm, the said bar being designed to extend vertically against one side of a plow-beam and the bend to extend away from said side of the beam, while the lower arm of the bend or extension projects laterally beneath the beam and beyond the upper bar, a second elongated bar having a longitudinal slot in its body-portion and an externally-screw-threaded integral bolt projecting at right angles from the bar, the second-named bar being designed to extend vertically against the opposite side of the plow-beam and the bolt to extend laterally beneath said beam and through the first-named bar, a bolt extending through the slots of the bars and designed to rest upon the upper side of the plow-beam, a fork for the colter having an open head or slide to receive the lower arm of the extension, and a bolt passed vertically through the fork-head and through the slot in the lower arm of the extension, substantially as set forth.

In testimony whereof I affix my signature in the presence of two witnesses.

WILLIAM J. STOWE.

Witnesses:
F. L. SHAW,
A. P. WILTY.